April 21, 1936.    J. M. PESTARINI    2,038,384

DIESEL ELECTRIC POWER SYSTEM

Filed Aug. 10, 1934

INVENTOR.

Joseph Maximus Pestarini

Patented Apr. 21, 1936

2,038,384

UNITED STATES PATENT OFFICE 2,038,384

DIESEL ELECTRIC POWER SYSTEM

Joseph Maximus Pestarini, Grant City,
Staten Island, N. Y.

Application August 10, 1934, Serial No. 739,333
In Great Britain December 4, 1933

49 Claims. (Cl. 290—14)

This invention relates to variable load Diesel-electric power systems more particularly but not exclusively for traction. In such systems it is of considerable importance that the output of the Diesel engine or other suitable prime mover be maintained substantially constant with variations in load and speed of the electric motors supplied by the Diesel driven generator, and heretofore this has been achieved by appropriate adjustment of the excitation of the generator, under control of the Diesel engine governor or of a wattmeter type relay, or a drooping generator characteristic has been relied upon. All these methods have various disadvantages which it is one of the objects of the present invention to avoid or minimize. The present invention in fact provides a system which is comparatively cheap, accurate, reliable, simple and smooth in operation; free from hunting and which is capable of controlling large excitations without undue commutator sparking and which takes into account the generator losses which vary with the voltage supplied to the motors.

Another object of my invention is to provide an electrical power system including a main generator inherently maintaining a constant power output upon the prime mover under varying load conditions.

According to the invention no governor is used for the Diesel engine and a special field winding, called a regulator field exciting winding, is provided instead on the generator and supplied from a machine, called a regulator dynamo-electric machine, driven directly or indirectly from the shaft of the engine and generator, the combination being arranged to cause the generator to have a current-voltage characteristic of approximately equilateral or symmetrical hyperbolic form.

The regulator dynamo-electric machine is essentially a shunt excited machine, rotating at its critical speed and opposing a source of direct current at a substantially constant voltage. The regulator machine supplies the regulator winding with a current that creates on the main generator a torque equal to the torque of the Diesel engine. When the current of the main generator changes, the torque of the Diesel engine is no longer balanced by the torque of the main electric generator and the speed of the whole set is caused to increase or decrease slightly, then the regulator machine supplies the regulator winding with more or less current until the balance of the torque of the electric generator and the Diesel engine is reached again, thus causing the voltage to vary when the current varies, like the ordinates of an equilateral hyperbola representing, in a current-voltage diagram, a constant output relation.

Further, according to the invention, some field arrangements are used with the main electric generator, permitting the obtaining of the hyperbolic current-voltage characteristic with relatively small variations of the current supplied by the regulator machine, the obtained regulation being thus more precise.

Finally, according to the invention some field arrangements on the regulator machine are used permitting a finer regulation, taking into account the resistance of the circuit of the regulator machine. The invention will be better understood and the field arrangements will be described in detail with the aid of the accompanying drawing.

Figure 1:
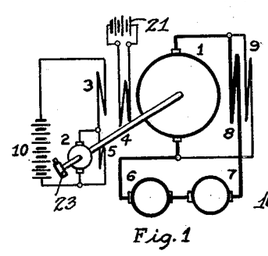
Fig. 1 gives the general arrangement, the main generator being a dynamo and the regulator machine being a shunt dynamo opposing a battery.

Referring to Fig. 1, the main generator is a dynamo electric machine 1, having a plurality of field exciting windings, the windings 3, 4, 8 and 9; the winding 3 is the regulator winding traversed by the regulator dynamo-electric current supplied by the regulator machine 2. The latter is a dynamo-electric machine with a shunt field 5, rotating at its critical speed and opposing a battery 10; the winding 4 is arranged to be separately excited, by a battery 21, to create a constant amount of ampere turns; the winding 9 is a shunt winding and the winding 8 is a series winding differentially arranged with respect to the windings 4 and 9. The main generator 1 is driven by a prime mover, such as Diesel engine 23 and is arranged to supply with current an electrical load comprising two motors 6 and 7 of a locomotive.

Figure 4:
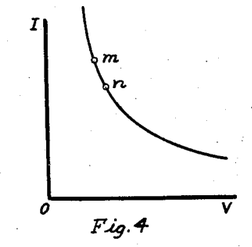
Figs. 4, 8 and 12 are current-voltage diagrams.

Let us consider the diagram of Fig. 4, where the main generator current is plotted against the main generator voltage, and suppose that we start from the working point $n$ and that the locomotive is accelerating; then the counter electromotive force of the motors will increase and therefore the current will decrease rapidly; the load torque of the main generator 1 will decrease and the whole set consisting of the Diesel engine 23 and the electric generators, will accelerate slightly as there is no governor. The voltage of the regulator machine 2, will then increase rapidly because the speed will be higher than the critical, and a large current will flow from the regulator machine 2 to the battery 10, traversing the regulator winding 3, and thus increasing the field excitation of the main generator 1 until the generator torque again balances the Diesel engine torque, the latter being a constant one when there is no governor. Thus we shall have a new working point $n$. Generally while the locomotive operates at various speeds the working point will slide, in the diagram of Fig. 4, along an equilateral hyperbola representing a constant output. More exactly the curve obtained will be slightly different from an hyperbola and it will take into account the losses of the electric generator which usually vary when the current and the voltage vary. In fact, the adjustment of the torque obtained by the regulator machine causes the torque of the Diesel engine to be equal to the resistant torque, which is the total of the component due to the output supplied by the electrical generator and of the component due to the losses of the same machine.

The working point representing on the diagram the total of the output of the electrical generator and of its losses, will slide along an exact hyperbola if the Diesel engine torque is constant. But this torque may vary even when the throttle opening is not modified by the governor for some accidental reason, for instance in case of an irregular fuel supply or in case of trouble in one cylinder. In this case the working point on the diagram will leave the hyperbola corresponding to the normal operation and it will slide along a lower hyperbola. This shows that the regulation obtained according to the present invention makes it possible to derive the best possible utilization of the Diesel engine without danger of undue overload in case of engine trouble.

Figure 8:
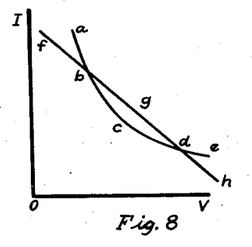
Figure 12:
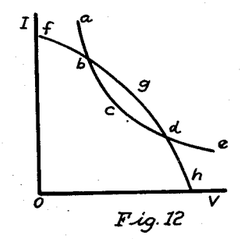

It is obvious that the operation will be better and the movement of the working point along the hyperbola more precise if the current variations required from the regulator machine are smaller. According to the invention this result is obtained by an arrangement of the field exciting windings of the main generator endowing the latter with a voltage-current characteristic, obtained with inoperative regulator winding, as close as possible to the desired hyperbola. With the aid of the three windings represented in the scheme of Fig. 1, the independently excited winding 4 giving constant ampere-turns, the series winding 8 and the shunt winding 9, suitably calculated, it is easy for one skilled in the art to provide the main generator with a characteristic represented in Fig. 8 by the straight line $fbgdh$ cutting the hyperbola $abcde$ in such a way as to leave a small difference of ordinates between the two lines. This difference of ordinates equals the value of the ampere turns that the regulator winding must supply. It is easy to see from the figure that the regulator winding ampere turns become least when they are sometimes positive and sometimes negative. The straight line characteristic is obtained when the iron is not saturated; with saturated iron the characteristic droops quickly for high values of voltage as shown by the line $fbgdh$ of Fig. 12, and the necessary regulator winding ampere turns are then larger. For the best adjustment, the regulator winding excitation must change direction and must be sometimes positive and sometimes negative; the shunt excited regulator opposing the constant voltage source, as shown on Fig. 1 has the property of supplying a regulator current in either direction. The regulator dynamo-electric machine is arranged so that when the speed is exactly the critical speed, the regulator current is zero, that is, the regulator generated voltage exactly equals the voltage of the battery 10. This is indicated by points $b$ and $d$ in Figs. 8 and 12 and corresponds to the normal operating speed of the prime mover. When the speed is slightly lower, the battery supplies current to the regulator machine, and we may then say that the regulator current is positive; when the speed is slightly higher than the critical one, the battery receives current from the regulator machine, and we may then say that the regulator current is negative.

Figure 2:
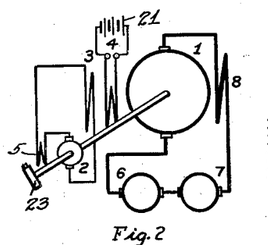
Fig. 2 and Fig. 3 show alternative systems with respectively a series dynamo and a shunt dynamo as the regulator machine.
Figure 3:
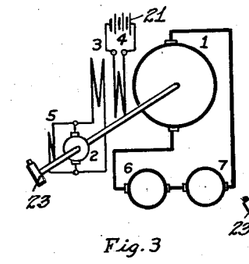

Figs. 2 and 3 show similar schemes, the former with a series dynamo-electric machine as a regulator machine, and the latter with a shunt dynamo-electric machine connected to both terminals of the regulator field exciting winding, no auxiliary source being opposed. In both these schemes the operation is very poor. In fact, the regulator current has only one direction, we may say that it can be exclusively negative; further the building up which occurs at the critical speed has a very discontinuous character, and it may be violent or it may be considerably retarded, and cause in both cases considerable trouble in operation. Therefore, although we mention these two cases, we suggest the use of only the improved case of the shunt excited regulator machine opposing a direct current source of approximately constant voltage.

The main generator driven by the Diesel engine 23 may be a dynamo-electric machine as considered up to now, or it may be a metadyne generator. The latter has already been dealt with in many previous American patents, for instance, in Patents No. 1,969,699; No. 1,945,447. A metadyne is a direct current dynamo-electric machine having a rotor or armature provided with windings and a commutator as in a conventional dynamo-electric machine, and a stator affording a path of low magnetic reluctance to the fluxes created by the rotor ampere turns, and having generally two sets of brushes electrically displaced from each other for providing a primary circuit and a secondary circuit through the metadyne rotor or armature, the current traversing one set of brushes creating, by its rotor ampere turns, a flux which induces an electromotive force between the brushes of the other set; one set called primary, and traversed by a current called primary, has its brushes kept at an essentially constant difference of voltage, and the other set, called secondary and traversed by a current called secondary, has its brushes connected to the terminals of the consumer. The stator of the metadyne may be provided with various field windings arranged to provide the metadyne with special characteristics appropriate to the special application considered.

A description in detail of the metadyne principles is given in a paper entitled "Esquisse sur la Metadyne" by J. M. Pestarini in the "Bulletin Scientifique A. I. M." No. 4, April 1931 of "L'Association des Ingenieurs Electriciens" published by the "Institut Electrotechnique Montefiore" Liege, Belgium.

Figures 5, 9:
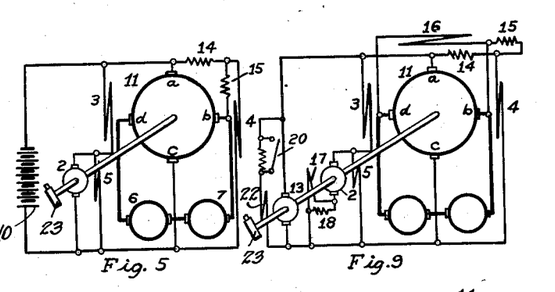
Fig. 5 and Fig. 6 give schemes where the electric generator is a metadyne, and where the regulator machine is a shunt dynamo opposing a battery.
Figs. 7 and 9 give schemes comprising a metadyne main generator and a shunt dynamo as the regulator machine, opposing an auxiliary dynamo generator driven by the same shaft as the main generator.

Fig. 5 gives a scheme where 11 is the metadyne generator having its primary brushes $a$ and $c$ connected to a battery 10, and its secondary brushes $b$ and $d$ connected to the terminals of the electrical load consisting of two motors 6 and 7. The regulator machine is a shunt excited dynamo-electric machine 2 opposing the battery through the regulator field exciting winding 3. This stator winding of the metadyne generator is so arranged as to induce by the flux produced by its ampere turns, an electromotive force between the primary brushes $a$ and $c$ of the metadyne generator. When the regulator field exciting winding is traversed by a negative regulator current, it produces a component of excitation in opposition to the secondary rotor ampere turns and therefore the secondary current supplied to the load increases; the reverse occurs when the regulator current is positive, the ampere turns of the regulator winding assisting the secondary rotor ampere turns; therefore the secondary current decreases, as the algebraic sum of the ampere turns in the direction of the commutation of the secondary brushes, that is, along the secondary commutating axis, must be constantly equal to the necessary amount for creating a flux inducing the primary electromotive force.

Thus the regulator dynamo-electric machine acts here in a similar way as in the case of Fig. 1, and therefore the secondary current supplied to the load will be represented in a secondary voltage—secondary current diagram by an hyperbola as shown by Fig. 4. In order to reduce the duty of the regulator dynamo-electric machine and thus obtain a more accurate adjustment of the characteristic, the metadyne generator is provided with a field arrangement that provides the metadyne with a secondary voltage—secondary current characteristic very close to the desired hyperbola, the regulator field exciting winding being considered as inactive. Fig. 5 shows such an arrangement; a field exciting winding 4 is provided on the stator of the metadyne creating by its ampere turns a flux along the secondary commutating axis which induces an electromotive voltage between the primary brushes, and therefore it controls the secondary current, and it is called secondary variator field exciting winding. Its excitation varies proportionally to the secondary voltage along a straight line the inclination of which is adjusted by the resistances 14 and 15 connecting one terminal of the winding 4 to the brushes $a$ and $b$ respectively, where the other terminal is connected to the brush $c$. By adequate design and correct adjustment of the resistances 14 and 15, the characteristic of the metadyne may be made to follow the straight line $fbgdh$ of Fig. 8, the regulator winding being assumed inactive. Thus the regulator winding ampere turns need be equal simply to the difference between the ordinates of the lines $fbgdh$ and $abcde$.

Figures 6, 10:
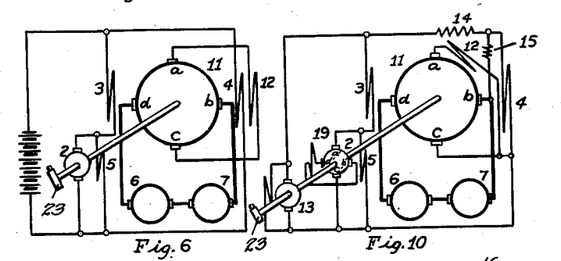
Figs. 10 and 11 give schemes comprising a metadyne main generator and a small metadyne either as regulator machine, or as auxiliary generator opposing the regulator machine; finally

Fig. 6 shows a main generator constituted by a metadyne dynamo-electric machine 11, the primary brushes $a$ and $c$ of which are connected to the two terminals of a low resistance stator field exciting winding 12, and therefore the primary brushes are practically short-circuited, and the voltage difference between them is practically zero. The regulator machine is still a shunt excited dynamo 2 opposed against a battery 10, through the regulator winding 3. It has been found that the operation is more stable if the primary current traverses a stator winding inducing by its ampere turns an electromotive force between the primary brushes opposing the primary current, that is, this winding produces a component of excitation along the secondary commutating axis. This is the reason for the winding 12 shown on Fig. 6. Further, the action of such a winding combined with the action of a winding 4 creating a constant number of ampere turns provides the metadyne, the regulator winding being assumed inactive, with a drooping characteristic very similar to the line $fbgdh$ of Fig. 12, and this characteristic is close to the desired hyperbola, $abcde$.

Figures 7, 11:
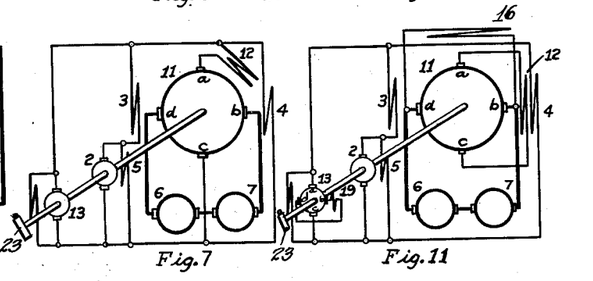

The regulator machine of the scheme of Fig. 7 is a shunt excited dynamo opposed against an auxiliary generator 13, called "base generator". In order to obtain from the latter a voltage as constant as possible throughout the range of variation in speed of the auxiliary dynamo-electric machine 13, its magnetic circuit is usually made very saturated. For the same reason the "base generator" 13 on Fig. 9 is schematically shown provided with a voltage regulating vibrator 20 acting upon the shunt field exciting winding 22.

The primary current of the metadyne generator may be reduced without decreasing the quick response property of the metadyne, by providing the stator with a field exciting winding producing by its ampere turns a flux inducing an electromotive force between the secondary brushes having the same direction as the one induced by the primary rotor ampere turns without the use of such a winding. Fig. 9 shows such a winding 16 connected across the secondary brushes, and in Fig. 7 the winding 12 traversed by the primary current performs two duties simultaneously: first, it induces an electromotive force between the primary brushes $a$ and $c$ opposed to the primary current, and second, it induces an electromotive force between the secondary brushes $b$ and $d$, in the same direction as the primary rotor ampere turns. This is produced by the arrangement of the field exciting winding 12 which produces a component of excitation along both the primary and the secondary commutating axes of the metadyne generator 11.

In order to improve the accurate adjustment of the constant output characteristic, we may use, according to this invention, some field arrangements on the regulator machine allowing for the ohmic drop along the regulator circuit. Fig. 9 shows such an arrangement consisting in the provision of a series winding 17 with very few turns inducing between the brushes of the regulator machine 2, an electromotive force in the same direction as the current. This series winding is preferably shunted by a resistance 18.

Fig. 10 shows another arrangement having the same purpose: the regulator machine 2 is a metadyne dynamo-electric machine, the primary brushes of which $a'$ and $c'$ are connected through the regulator field exciting winding 3 to the "base generator" having its terminals kept at a practically constant voltage difference; the secondary brushes $b'$ and $d'$ of the regulator metadyne supply with current a stator winding 19 which is arranged to produce a component of excitation along the secondary commutating axis of the auxiliary regulator metadyne dynamo-electric machine for inducing an electromotive force between the primary brushes $a'$ and $c'$ in the same direction as the regulator current.

A similar arrangement is shown by Fig. 11 where the "base generator" is a metadyne dynamo-electric machine 13, and the regulator machine is a shunt excited dynamo electric machine 2. On both Figures 10 and 11 the metadyne main generator has its primary brushes short circuited through a stator field exciting winding 12 which on the scheme of Fig. 10 induces an electromotive force between primary and between secondary brushes and on the scheme of Fig. 11, it induces an electromotive force only between primary brushes.

Various modifications of the arrangements above described will occur to those skilled in the art. I desire it to be understood, therefore, that my invention is not to be limited to the particular embodiments set forth, and I intend in the appended claims to cover all modifications which do not depart from the spirit and scope of my invention.

Having now particularly described and ascertained the nature of my said invention, and in what manner the same is to be performed, I declare that what I claim is:

1. A power system including a prime mover and a generator driven thereby, an electrical load, means for connecting said electrical load to said generator, a field exciting winding for said generator, a source of substantially constant potential electrical power supply, means for connecting said source of electrical power supply to said generator field exciting winding, means for varying the excitation of said generator in accordance with an electrical characteristic of said generator, an auxiliary dynamo-electric machine, means for driving said auxiliary dynamo-electric machine in a predetermined speed relation to the speed of said generator, a second field exciting winding for said generator, and means for connecting said auxiliary dynamo-electric machine in opposition to said source of substantially constant potential electrical power supply across said second generator field exciting winding.

2. A power system including a prime mover and a generator driven thereby, an electrical load, means for connecting said electrical load to said generator, a field exciting winding for said generator, a source of substantially constant potential electrical power supply, means for connecting said source of electrical power supply to said generator field exciting winding, means for varying the excitation of said generator in accordance with an electrical characteristic of said generator, an auxiliary dynamo-electric machine, means for driving said auxiliary dynamo-electric machine in a predetermined speed relation to the speed of said generator, a second field exciting winding for said generator, means for connecting said auxiliary dynamo-electric machine in opposition to said source of substantially constant potential electrical power supply across said second field exciting winding, and an excitation system for said auxiliary dynamo-electric machine constructed and energized so that the electrical potential across said auxiliary dynamo-electric machine is substantially equal to the electrical potential of said source of electrical power supply when operating at the critical speed of said auxiliary dynamo-electric machine.

3. A power system including a prime mover and a generator driven thereby, an electrical load, means for connecting said electrical load to said generator, a field exciting winding for said generator, a source of substantially constant potential electrical power supply, means for connecting said source of electrical power supply to said generator field exciting winding, means for varying the excitation of said generator in accordance with an electrical characteristic of said generator, an auxiliary dynamo-electric machine, means for driving said auxiliary dynamo-electric machine in a predetermined speed relation to the speed of said generator, a second field exciting winding for said generator, means for connecting said auxiliary dynamo-electric machine in opposition to said source of substantially constant potential electrical power supply across said second field exciting winding, an excitation system for said auxiliary dynamo-electric machine including a field exciting winding, and means for energizing said last mentioned field exciting winding so that the electrical potential across said auxiliary dynamo-electric machine is substantially equal to the electrical potential of said source of electrical power supply when said auxiliary dynamo-electric machine operates at the critical speed thereof.

4. A power system including a prime mover and a generator driven thereby, an electrical load, means for connecting said electrical load to said generator, a field exciting winding for said generator, a source of substantially constant potential electrical power supply, means for connecting said source of electrical power supply to said generator field exciting winding, means for varying the excitation of said generator in accordance with an electrical characteristic of said generator, an auxiliary dynamo-electric machine, means for driving said auxiliary dynamo-electric machine in a predetermined speed relation to the speed of said generator, a second field exciting winding for said generator, means for connecting said auxiliary dynamo-electric machine in opposition to said source of substantially constant potential electrical power supply across said second field exciting winding, an excitation system for said auxiliary dynamo-electric machine including a field exciting winding, means for energizing said auxiliary dynamo-electric machine field exciting winding in accordance with the electrical potential across said auxiliary dynamo-electric machine, said auxiliary dynamo-electric machine excitation system being constructed and arranged so that the electrical potential across said auxiliary dynamo-electric machine is substantially equal to the electrical potential of said source of electrical power supply when said prime mover operates at normal speed.

5. A power system including a prime mover and a generator driven thereby, an electrical load, means for connecting said electrical load to said generator, means including a field exciting winding and a source of substantially constant potential electrical power supply connected thereto for supplying a substantially constant component of excitation to said generator, means for varying the excitation of said generator in accordance with an electrical characteristic of said generator, and means responsive to the speed of said generator varying the excitation thereof including a second field exciting winding and an auxiliary dynamo-electric machine connected thereto and in opposition to said source of electrical power supply for maintaining a substantially constant load on said prime mover throughout the range of variation in current demand of said electrical load on said generator.

6. A power system including a prime mover and a generator driven thereby, an electrical means for connecting said electrical load to generator, a field exciting winding for said erator, a source of substantially constant potential electrical power supply, means for connecting said source of electrical power supply to said generator field exciting winding, an auxiliary dynamo-electric machine, means for driving said auxiliary dynamo-electric machine in a predetermined speed relation to the speed of said generator, a second field exciting winding for said generator, means for connecting said auxiliary dynamo-electric machine in opposition to said source of substantially constant potential electrical power supply across said generator second field exciting winding, and means including a third generator field exciting winding for varying the excitation of said generator in accordance with an electrical characteristic thereof.

7. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said second metadyne generator field exciting winding for maintaining a substantially constant load on said prime mover throughout the range of variation in current demand of said electrical load on said metadyne generator, and means dependent upon an electrical characteristic of said metadyne generator for varying the excitation of said metadyne generator.

8. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means dependent upon the voltage across said primary brush set for energizing said metadyne generator field exciting winding, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said second metadyne generator field exciting winding for maintaining a substantially constant load on said prime mover throughout the range of variation in current demand of said electrical load on said metadyne generator, and means dependent upon an electrical characteristic of said metadyne generator for varying the excitation of said metadyne generator.

9. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, an excitation system for said auxiliary dynamo-electric machine including a field exciting winding constructed and energized so that the electrical potential across said auxiliary dynamo-electric machine is substantially equal to the electrical potential of said source of electrical power supply when operating at the critical speed of said auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said second metadyne generator field exciting winding for maintaining a substantially constant load on said prime mover throughout the range of variation in current demand of said electrical load on said metadyne generator, and means dependent upon an electrical characteristic of said metadyne generator for varying the excitation of said metadyne generator.

10. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, and means responsive to the speed of said generator varying the excitation thereof including a second field exciting winding and an auxiliary dynamo-electric machine connected thereto in opposition to said source of electrical power supply for maintaining a substantially constant load on said prime mover throughout the range of variation in current demand of said electrical load on said generator.

11. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, means for connecting said primary brush set across said source of electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, and means dependent upon an electrical characteristic of said metadyne generator for varying the excitation of said metadyne generator.

12. A power system including a prime mover and a generator driven thereby, an electrical load, means for connecting said electrical load to said generator, a field exciting winding for said generator, an auxiliary dynamo-electric machine, means including a field exciting winding providing a highly sensitive speed variable excitation system for said auxiliary dynamo-electric machine, a second auxiliary dynamo-electric machine, an excitation system for said second auxiliary dynamo-electric machine including a highly saturated magnetic circuit, means for mechanically coupling said auxiliary dynamo-electric machines and said generator, means for connecting said second auxiliary dynamo-electric machine across said generator field exciting winding, a second field exciting winding for said generator, and means for connecting said first mentioned auxiliary dynamo-electric machine in opposition to said second auxiliary dynamo-electric machine across said second generator field exciting winding.

13. A power system including a prime mover and a generator driven thereby, an electrical load, means for connecting said electrical load to said generator, a field exciting winding for said generator, an auxiliary dynamo-electric machine, means including a field exciting winding providing a highly sensitive speed variable excitation system for said auxiliary dynamo-electric machine, a second auxiliary dynamo-electric machine, an excitation system for said second auxiliary dynamo-electric machine including a field exciting winding constructed and energized so that the electrical potential of said second auxiliary dynamo-electric machine is substantially constant throughout the range of variation in speed of said second auxiliary dynamo-electric machine, means for mechanically coupling said auxiliary dynamo-electric machines and said generator, means for connecting said second auxiliary dynamo-electric machine across said generator field exciting winding, a second field exciting winding for said generator, and means for connecting said first mentioned auxiliary dynamo-electric machine in opposition to said second auxiliary dynamo-electric machine across said second generator field exciting winding.

14. A power system including a prime mover and a generator driven thereby, an electrical load, means for connecting said electrical load to said generator, a field exciting winding for said generator, an auxiliary dynamo-electric machine, means including a field exciting winding providing a highly sensitive speed variable excitation system for said auxiliary dynamo-electric machine, a second auxiliary dynamo-electric machine, a field exciting winding for said second dynamo-electric machine, means for energizing said field exciting winding of said second dynamo-electric machine in accordance with the electrical potential across said second dynamo-electric machine, means for mechanically coupling said auxiliary dynamo-electric machines and said generator, means for connecting said second auxiliary dynamo-electric machine across said generator field exciting winding, a second field exciting winding for said generator, and means for connecting said first mentioned auxiliary dynamo-electric machine in opposition to said second auxiliary dynamo-electric machine across said second generator field exciting winding.

15. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said second metadyne generator field exciting winding for maintaining a substantially constant load on said prime mover throughout the range of variation in current demand of said electrical load on said metadyne generator, and means dependent upon an electrical characteristic of said secondary circuit for varying the excitation of said metadyne generator.

16. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a field exciting winding for said metadyne generator, an auxiliary dynamo electric machine, means including a field exciting winding providing a highly sensitive speed variable excitation system for said auxiliary dynamo-electric machine, a second auxiliary dynamo-electric machine, an excitation system including a highly saturated magnetic circuit for said second auxiliary dynamo-electric machine, means for mechanically coupling said auxiliary dynamo-electric machines and said metadyne generator, means for connecting said second auxiliary dynamo-electric machine across said metadyne generator field exciting winding, a second field exciting winding for said metadyne generator, and means for connecting said first mentioned auxiliary dynamo-electric machine in opposition to said second auxiliary dynamo-electric machine across said metadyne generator second field exciting winding.

17. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a field exciting winding arranged to produce a component of excitation along the secondary commutating axis of said metadyne generator, an auxiliary dynamo-electric machine, a second auxiliary dynamo-electric machine, a field exciting winding for said second dynamo-electric machine, means for energizing said field exciting winding of said second auxiliary dynamo-electric machine in accordance with the electric potential across said second auxiliary dynamo-electric machine, means for mechanically coupling said auxiliary dynamo-electric machines and said metadyne generator, means for connecting said second auxiliary dynamo-electric across said metadyne generator primary brush set and across said metadyne generator field exciting winding, a second field exciting winding for said metadyne generator, and means for connecting said first mentioned auxiliary dynamo-electric machine in opposition to said second auxiliary dynamo-electric machine across said metadyne generator second field exciting winding.

18. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a field exciting winding arranged to produce a component of excitation along the secondary commutating axis of said metadyne generator, an auxiliary dynamo-electric machine, means including a field exciting winding providing a highly sensitive speed variable excitation system for said auxiliary dynamo-electric machine, a second auxiliary dynamo-electric machine, an excitation system for said second auxiliary dynamo-electric machine including a field exciting winding constructed and energized so that the electrical potential of said second auxiliary dynamo-electric machine is substantially constant throughout the range of variation in speed of said second auxiliary dynamo-electric machine, means for mechanically coupling said auxiliary dynamo-electric machines and said generator, means for connecting said second auxiliary dynamo-electric machine across said metadyne generator field exciting winding, a second field exciting winding for said metadyne generator arranged to produce a component of excitation along the secondary commutating axis of said metadyne generator, and means for connecting said first mentioned auxiliary dynamo-electric machine in opposition to said second auxiliary dynamo-electric machine across said metadyne generator second field exciting winding.

19. A power system including a prime mover and a generator driven thereby, an electrical load, means for connecting said electrical load to said generator, a field exciting winding for said generator, a source of substantially constant potential electrical power supply, means for connecting said source of electrical power supply to said generator field exciting winding, an auxiliary dynamo-electric machine, means for driving said auxiliary dynamo-electric machine in a predetermined speed relation to the speed of said generator, a second field exciting winding for said generator, means for connecting said auxiliary dynamo-electric machine in opposition to said source of substantially constant potential electrical power supply across said generator second field exciting winding, a third field exciting winding for said generator, and means for energizing said generator third field exciting winding in accordance with the electrical potential across said electrical load.

20. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, means dependent upon the voltage between a brush of said primary brush set and a brush of said secondary brush set for varying the energization of said field exciting winding, an auxiliary dynamo-electric machine, means for mechanically coupling said metadyne generator and said auxiliary dynamo-electric machine, a second field exciting winding for said metadyne generator, and means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator.

21. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding for said metadyne generator, and means dependent upon the voltage across said primary brush set energizing said metadyne generator third field exciting winding for producing a component of excitation between said secondary brush set in the same direction as the excitation therebetween due to current in said primary armature circuit.

22. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, means dependent upon the voltage between a brush of said primary brush set and a brush of said secondary brush set for varying the energization of said metadyne generator field exciting winding, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along the primary commutating axis of said metadyne generator, and means dependent upon the voltage across said primary brush set for energizing said metadyne generator third field exciting winding.

23. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, and means dependent upon the voltage across said secondary brush set for varying the excitation of said metadyne generator.

24. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, and means dependent upon the voltage across said secondary brush set and including a third field exciting winding arranged to produce a component of excitation along the primary commutating axis of said metadyne generator for varying the excitation of said metadyne generator.

25. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means dependent upon the voltage across said primary brush set for energizing said metadyne generator field exciting winding, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, and means dependent upon the voltage across said secondary brush set and including a third field exciting winding arranged to produce a component of excitation along the primary commutating axis of said metadyne generator for varying the excitation of said metadyne generator.

26. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, a field exciting winding arranged to produce a component of excitation along the secondary commutating axis of said metadyne generator, an electrical load connected across said secondary brush set, an auxiliary dynamo-electric machine, means including a field exciting winding providing a highly sensitive speed variable excitation system for said auxiliary dynamo-electric machine, a second auxiliary dynamo-electric machine, a field exciting winding for said second dynamo-electric machine, means for energizing said field exciting winding of said second dynamo-electric machine in accordance with the electrical potential across said second dynamo-electric machine, means for varying the energization of said field exciting winding of said second dynamo-electric machine so that the electrical potential of said second dynamo-electric machine is substantially constant throughout the range of variation in speed of said second dynamo-electric machine, means for mechanically coupling said auxiliary dynamo-electric machines and said generator, means for connecting said second auxiliary dynamo-electric machine across said metadyne generator field exciting winding, a second field exciting winding for said metadyne generator arranged to produce a component of excitation along the secondary commutating axis of said metadyne generator, and means for connecting said first mentioned auxiliary dynamo-electric machine in opposition to said second auxiliary dynamo-electric machine across said metadyne generator second field exciting winding.

27. A power system including a prime mover and a generator driven thereby, an electrical load, means for connecting said electrical load to said generator, a field exciting winding for said generator, an auxiliary dynamo-electric machine, means including a field exciting winding providing a highly sensitive speed variable excitation system for said auxiliary dynamo-electric machine, a second auxiliary dynamo-electric machine, a field exciting winding for said second dynamo-electric machine, means for energizing said field exciting winding of said second dynamo-electric machine in accordance with the electrical potential across said second dynamo-electric machine, means for varying the energization of said field exciting winding of said second auxiliary dynamo-electric machine so that the electrical potential of said second auxiliary dynamo-electric machine is substantially constant throughout the range of variation in speed thereof, means for mechanically coupling said auxiliary dynamo-electric machines and said generator, means for connecting said second auxiliary dynamo-electric machine across said generator field exciting winding, a second field exciting winding for said generator, and means for connecting said first mentioned auiliary dynamo-electric machine in opposition to said second auxiliary dynamo-electric machine and across said generator second field exciting winding.

28. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, a field exciting winding arranged to produce a component of excitation along the secondary communicating axis of said metadyne generator, an electrical load connected across said secondary brush set, an auxiliary dynamo-electric machine, a field exciting winding for said auxiliary dynamo-electric machine, means dependent upon the voltage across said auxiliary dynamo-electric machine for energizing said auxiliary dynamo-electric machine field exciting winding, a second field exciting winding for said auxiliary dynamo-electric machine, means dependent on the current in said auxiliary dynamo-electric machine for energizing said second field exciting winding of said auxiliary dynamo-electric machine, a second auxiliary dynamo-electric machine, a field exciting winding for said second dynamo-electric machine, means for energizing said field exciting winding of said second dynamo-electric machine in accordance with the electrical potential across said second dynamo-electric machine, means for varying the energization of said field exciting winding of said second dynamo-electric machine so that the electrical potential of said second dynamo-electric machine is substantially constant throughout the range of variation in speed of said second dynamo-electric machine, means for mechanically coupling said auxiliary dynamo-electric machines and said generator, means for connecting said second auxiliary dynamo-electric machine across said generator field exciting winding, a second field exciting winding for said metadyne generator arranged to produce a component of excitation along the secondary commutating axis of said metadyne generator, and means for connecting said first mentioned auxiliary dynamo-electric machine in opposition to said second auxiliary dynamo-electric machine across said metadyne generator second field exciting winding.

29. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, a field exciting winding arranged to provide a component of excitation along the secondary commutating axis of said metadyne generator, an electrical load connected across said secondary brush set, an auxiliary dynamo-electric machine, a field exciting winding for said auxiliary dynamo-electric machine, means dependent upon the voltage across said auxiliary dynamo-electric machine for energizing said auxiliary dynamo-electric machine field exciting winding, means including a second field exciting winding energized in accordance with the current in said auxiliary dynamo-electric machine for varying the excitation of said auxiliary dynamo-electric machine to compensate for the voltage drop in said auxiliary dynamo-electric machine, a second auxiliary dynamo-electric machine, a field exciting winding for said second dynamo-electric machine, means for energizing said field exciting winding of said second dynamo-electric machine in accordance with the electrical potential across said second dynamo-electric machine, means for varying the energization of said field exciting winding of said second dynamo-electric machine so that the electrical potential of said second dynamo-electric machine is substantially constant throughout the range of variation in speed of said second dynamo-electric machine, means for mechanically coupling said auxiliary dynamo-electric machines and said generator, means for connecting said second auxiliary dynamo-electric machine across said metadyne generator field exciting winding, a second field exciting winding for said metadyne generator arranged to produce a component of excitation along the secondary commutating axis of said metadyne generator, and means for connecting said first mentioned auxiliary dynamo-electric machine in opposition to said second auxiliary dynamo-electric machine across said metadyne generator second field exciting winding.

30. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, a field exciting winding arranged to provide a component of excitation along the secondary commutating axis of said metadyne generator, an electrical load connected across said secondary brush set, an auxiliary dynamo-electric machine, a field exciting winding for said auxiliary dynamo-electric machine, means dependent upon the voltage across said auxiliary dynamo-electric machine for energizing said auxiliary dynamo-electric machine field exciting winding, means for varying the excitation of said auxiliary dynamo-electric machine to compensate for the voltage drop in said auxiliary dynamo-electric machine, a second auxiliary dynamo-electric machine, a field exciting winding for said second auxiliary dynamo-electric machine, means for energizing said field exciting winding of said second auxiliary dynamo-electric machine in accordance with the electrical potential across said second auxiliary dynamo-electric machine, means for varying the energization of said field exciting winding of said second auxiliary dynamo-electric machine so that the electrical potential of said second auxiliary dynamo-electric machine is substantially constant throughout the range of variation in speed of said second auxiliary dynamo-electric machine, means for mechanically coupling said auxiliary dynamo-electric machines and said generator, means for connecting said second auxiliary dynamo-electric machine across said generator field exciting winding, a second field exciting winding for said metadyne generator arranged to produce a component of excitation along the secondary commutating axis of said metadyne generator, and means for connecting said first mentioned auxiliary dynamo-electric machine in opposition to said second auxiliary dynamo-electric machine across said metadyne generator second field exciting winding.

31. A power system including a prime mover and a main metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said main metadyne generator, means for connecting said main metadyne generator field exciting winding to said source of electrical power supply, an auxiliary metadyne generator provided with an armature, means including a primary brush set and a secondary brush set associated with said armature of said auxiliary metadyne generator for providing a primary circuit and a secondary circuit therethrough, said secondary brush set of said auxiliary metadyne generator being electrically displaced from said primary brush set of said auxiliary metadyne generator, means for connecting said primary brush set of said auxiliary metadyne generator across said main metadyne generator field exciting winding, a field exciting winding arranged to produce a component of excitation along the secondary commutating axis of said auxiliary metadyne generator, means dependent upon the voltage across said primary brush set of said auxiliary metadyne generator for energizing said field exciting winding of said auxiliary metadyne generator, means including a second field exciting winding connected across said secondary brush set of said auxiliary metadyne generator arranged to produce a component of excitation along the secondary commutating axis of said auxiliary metadyne generator to compensate for the voltage drop between the primary brush set of said auxiliary metadyne generator, means for mechanically coupling said main metadyne generator and said auxiliary metadyne generator, a second field exciting winding for said main metadyne generator, and means for connecting said source of electrical power supply in opposition to said auxiliary metadyne generator primary brush set across said main metadyne generator second field exciting winding.

32. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along the secondary commutating axis of said metadyne generator, and means dependent upon the voltage across said primary brush set for energizing said metadyne generator third field exciting winding.

33. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding arranged to produce a component of excitation along the secondary commutating axis of said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding of low resistance arranged to produce a component of excitation along the secondary commutating axis of said metadyne generator, and means connecting said metadyne generator third field exciting winding across said primary brush set for providing a low resistance external primary circuit.

34. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding arranged to produce a component of excitation along the secondary commutating axis of said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along the secondary commutating axis of said metadyne generator, and means dependent upon the voltage across said primary brush set energizing said metadyne generator third field exciting winding for controlling the current in said primary circuit.

35. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding arranged to produce a component of excitation along the secondary commutating axis of said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along the primary commutating axis of said metadyne generator, and means dependent upon the voltage across said primary brush set for energizing said metadyne generator third field exciting winding.

36. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding arranged to produce a component of excitation along the secondary commutating axis of said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, and means dependent upon the voltage across said primary brush set for producing a component of excitation along both the primary and secondary commutating axes of said metadyne generator.

37. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding arranged to produce a component of excitation along the secondary commutating axis of said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along both the primary and the secondary commutating axes of said metadyne generator, and means dependent upon the voltage across said primary brush set for energizing said metadyne generator third field exciting winding.

38 A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said prime mover throughout the range of variation in current demand of said electrical load on said metadyne generator, a third field exciting winding arranged to produce a component of excitation along the secondary commutating axis of said metadyne generator for controlling the current in said primary circuit and arranged to produce a component of excitation between said secondary brush set in the same direction as the excitation therebetween due to current in said primary armature circuit, and means dependent upon the voltage across said primary brush set for energizing said metadyne generator third field exciting winding.

39. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said metadyne generator, means for connecting said metadyne generator field exciting winding to said source of electrical power supply, means dependent upon the voltage between a brush of said primary brush set and a brush of said secondary brush set for varying the energization of said metadyne generator field exciting winding, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said primary mover throughout the range of variation in current demand of said electrical load on said metadyne generator, a third field exciting winding arranged to produce a component of excitation along both the primary commutating axis and the secondary commutating axis of said metadyne generator, and means dependent upon the voltage across said primary brush set for energizing said metadyne generator third field exciting winding.

40. A power system including a prime mover and a main metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said main metadyne generator, means for connecting said main metadyne generator field exciting winding to said source of electrical power supply, an auxiliary metadyne generator provided with an armature, means including a primary brush set and a secondary brush set associated with said auxiliary metadyne generator armature for providing a primary circuit and a secondary circuit therethrough, said secondary brush set of said auxiliary metadyne generator being electrically displaced from said primary brush set of said auxiliary metadyne generator, means for connecting said primary brush set of said auxiliary metadyne generator across said main metadyne generator field exciting winding, means for mechanically coupling said main metadyne generator and said auxiliary metadyne generator, a field exciting winding arranged to produce a component of excitation along the secondary commutating axis of said auxiliary metadyne generator, means dependent upon the voltage across said primary brush set of said auxiliary metadyne generator for energizing said field exciting winding of said auxiliary metadyne generator, means including a second field exciting winding connected across said secondary brush set of said auxiliary metadyne generator arranged to produce a component of excitation along the secondary commutating axis of said auxiliary metadyne generator for compensating for the voltage drop between the primary brush set of said auxiliary metadyne generator, means for mechanically coupling said main metadyne generator and said auxiliary metadyne generator, a second field exciting winding for said main metadyne generator, means for connecting said source of electrical power supply in opposition to said auxiliary metadyne generator primary brush set across said main metadyne generator second field exciting winding, a third field exciting winding arranged to produce a component of excitation along the secondary commutating axis of said main metadyne generator, and means dependent upon the voltage across said main metadyne generator primary brush set for energizing said main metadyne generator third field exciting winding.

41. A power system including a prime mover and a main metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a source of substantially constant potential electrical power supply, a field exciting winding arranged to produce a component of excitation along the secondary commutating axis of said main metadyne generator, means for connecting said main metadyne generator field exciting winding to said source of electrical power supply, an auxiliary metadyne generator provided with an armature, means including a primary brush set and a secondary brush set associated with said auxiliary metadyne generator armature for providing a primary circuit and a secondary circuit therethrough, said secondary brush set of said auxiliary metadyne generator being electrically displaced from said primary brush set of said auxiliary metadyne generator, means for connecting said primary brush set of said auxiliary metadyne generator across said main metadyne generator field exciting winding, means for mechanically coupling said main metadyne generator and said auxiliary metadyne generator, a second field exciting winding for said main metadyne generator, and means connecting said auxiliary metadyne generator primary brush set in opposition to said source of electrical power supply across said main metadyne generator second field exciting winding for maintaining a substantially constant load on said prime mover throughout the range of variation in current demand of said electrical load on said main metadyne generator.

42. A power system including a prime mover and a metadyne generator having an armature driven thereby, means including a primary brush set and a secondary brush set associated with said armature for providing a primary circuit and a secondary circuit therethrough, said secondary brush set being electrically displaced from said primary brush set, an electrical load connected across said secondary brush set, a field exciting winding arranged to produce a component of excitation along the secondary commutating axis of said main metadyne generator, an auxiliary dynamo-electric machine, a field exciting winding for said auxiliary dynamo electric machine, means dependent upon the voltage across said auxiliary dynamo electric machine for energizing said auxiliary dynamo electric machine field exciting winding, an auxiliary metadyne generator provided with an armature, means including a primary brush set and a secondary brush set associated with said armature for providing a primary circuit and a secondary circuit therethrough, said secondary brush set of said auxiliary metadyne generator being electrically displaced from said primary brush set of said auxiliary metadyne generator, means for mechanically coupling said metadyne generators and said auxiliary dynamo-electric machine, means for connecting said primary brush set of said auxiliary metadyne generator across said main metadyne generator field exciting winding, a second field exciting winding arranged to produce a component of excitation along the secondary commutating axis of said main metadyne generator, and means connecting said auxiliary metadyne generator primary brush set in opposition to said auxiliary dynamo-electric machine across said main metadyne generator second field exciting winding for maintaining a substantially constant load on said prime mover.

43. A power system including a prime mover and a main metadyne generator having an armature driven thereby, means including a primary brush set and a secondary brush set associated with said armature for providing a primary circuit and a secondary circuit therethrough, said seconday brush set being electrically displaced from said primary brush set, an electrical load connected across said secondary brush set, a field exciting winding arranged to produce a component of excitation along the secondary commutating axis of said main metadyne generator, an auxiliary dynamo-electric machine, an auxiliary metadyne generator provided with an armature, means including a primary brush set and a secondary brush set associated with said auxiliary metadyne generator armature for providing a primary circuit and a secondary circuit therethrough, said secondary brush set of said auxiliary metadyne generator being electrically displaced from said primary brush set of said auxiliary metadyne generator, a field exciting winding arranged to produce a component of excitation along the secondary commutating axis of said auxiliary metadyne generator, means dependent upon the voltage across said primary brush set of said auxiliary metadyne generator for energizing said field exciting winding of said auxiliary metadyne generator, means including a second field exciting winding connected across said secondary brush set of said auxiliary metadyne generator arranged to produce a component of excitation along the secondary commutating axis of said auxiliary metadyne generator to compensate for the voltage drop between the primary brush set of said auxiliary metadyne generator, means for mechanically coupling said metadyne generators and said auxiliary dynamo-electric machine, means for connecting said primary brush set of said auxiliary metadyne generator across said main metadyne generator field exciting winding, a second field exciting winding arranged to produce a component of excitation along the secondary commutating axis of said main metadyne generator, and means connecting said auxiliary metadyne primary brush set in opposition to said auxiliary dynamo-electric machine across said main metadyne generator second field exciting winding for maintaining a substantially constant load on said prime mover.

44. An electric generator provided with an armature, means including a field exciting winding and a source of substantially constant potential electrical power supply connected thereto for supplying a substantially constant component of excitation to said generator, means for varying the excitation of said generator in accordance with an electrical characteristic of said generator, an electrical load connected to said generator, and means responsive to the speed of said generator varying the excitation thereof including a second field exciting winding and an auxiliary dynamo-electric machine connected thereto and in opposition to said source of electrical power supply for maintaining a substantially constant load on said generator.

45. An electric generator including an armature, a field exciting winding for said generator, a source of substantially constant potential electrical power supply, means for connecting said source of electrical power supply to said generator field exciting winding, means for varying the excitation of said generator in accordance with the electrical characteristic of said generator, an auxiliary dynamo-electric machine, means for driving said auxiliary dynamo-electric machine in a predetermined speed relation to the speed of said generator, a second field exciting winding for said generator, and means for connecting said auxiliary dynamo-electric machine in opposition to said source of substantially constant potential electrical power supply across said generator second field exciting winding.

46. An electric generator including an armature, brushes associated with said armature, a field exciting winding for said generator, means including a source of substantially constant potential electrical power supply for energizing said field exciting winding, means for varying the excitation of said generator in accordance with an electrical characteristic thereof, an auxiliary dynamo-electric machine, means for mechanically coupling said auxiliary dynamo-electric machine and said generator, a second field exciting winding for said generator, means for connecting said auxiliary dynamo-electric machine in opposition to said source of substantially constant potential electrical power supply across said generator second field exciting winding, and means including a field exciting winding providing a highly sensitive speed variable excitation system for said auxiliary dynamo-electric machine constructed and energized so that the electrical potential across said auxiliary dynamo-electric machine is substantially equal to the electrical potential of said source of electrical power supply when operating at the critical speed of said auxiliary dynamo-electric machine.

47. An electric generator provided with an armature, a field exciting winding for said generator, an auxiliary dynamo-electric machine, means including a field exciting winding providing a highly sensitive speed variable excitation system for said auxiliary dynamo-electric machine, a second auxiliary dynamo-electric machine, a field exciting winding for said second auxiliary dynamo-electric machine, means for energizing said field exciting winding of said second auxiliary dynamo-electric machine in accordance with the potential across said second dynamo-electric machine, means for varying the energization of said field exciting winding of said second auxiliary dynamo-electric machine so that the electrical potential of said second auxiliary dynamo-electric machine is substantially constant throughout the range of variation in speed thereof, means for mechanically coupling said auxiliary dynamo-electric machines and said generator, means for connecting said second auxiliary dynamo-electric machine across said generator field exciting winding, a second field exciting winding for said generator, and means for connecting said first mentioned auxiliary dynamo-electric machine in opposition to said second auxiliary dynamo-electric machine across said generator second field exciting winding.

48. A metadyne generator provided with an armature, means including a primary brush set and a secondary brush set associated with said armature for providing a primary circuit and a secondary circuit therethrough, said seconday brush set being electrically displaced from said primary brush set, a source of substantially constant potential electrical power supply, a field exciting winding arranged to produce a component of excitation along the secondary commutating axis of said metadyne generator, means dependent upon the voltage across said primary brush set for energizing said metadyne generator field exciting winding, an auxiliary dynamo-electric machine, means for mechanically coupling said metadyne generator and said auxiliary dynamo-electric machine, a second field exciting winding for said metadyne generator, means connecting said source of electrical power supply in opposition to said auxiliary dynamo-electric machine across said metadyne generator second field exciting winding for maintaining a substantially constant load on said metadyne generator, and means dependent upon an electrical characteristic of said metadyne generator for varying the excitation of said metadyne generator.

49. A metadyne generator provided with an armature, means including a primary brush set and a secondary brush set associated with said armature for providing a primary circuit and a secondary circuit therethrough, said seconday brush set being electrically displaced from said primary brush set, a source of substantially constant potential electrical power supply, a field exciting winding arranged to produce a component of excitation along the secondary commutating axis of said metadyne generator, means for connecting said metadyne generator field exciting winding to said source of electrical power supply, an auxiliary metadyne generator provided with an armature, means including a primary brush set and a secondary brush set associated with said auxiliary metadyne generator armature for providing a primary circuit and a secondary circuit therethrough, said secondary brush set of said auxiliary metadyne generator being electrically displaced from said primary brush set of said auxiliary metadyne generator, means for connecting said primary brush set of said auxiliary metadyne generator across said main metadyne generator field exciting winding, means for mechanically coupling said main metadyne generator and said auxiliary metadyne generator, a field exciting winding arranged to produce a component of excitation along the secondary commutating axis of said auxiliary metadyne generator, means dependent upon the voltage across said primary brush set of said auxiliary metadyne generator for energizing said field exciting winding of said auxiliary metadyne generator, means including a second field exciting winding connected across said secondary brush set of said auxiliary metadyne generator and arranged to produce a component of excitation along the secondary commutating axis of said auxiliary metadyne generator to compensate for the voltage drop between the primary brush set of said auxiliary metadyne generator, a second field exciting winding for said main metadyne generator, and means for connecting said source of electrical power supply in opposition to said auxiliary metadyne generator primary brush set across said main metadyne generator second field exciting winding.

JOSEPH MAXIMUS PESTARINI.